United States Patent
Noda et al.

(10) Patent No.: US 7,783,139 B2
(45) Date of Patent: Aug. 24, 2010

(54) POLARIZED LIGHT MODE CONVERTER

(75) Inventors: Susumu Noda, Kyoto (JP); Takashi Asano, Kyoto (JP); Yoshinori Tanaka, Kyoto (JP); Seiichi Takayama, Tokyo (JP)

(73) Assignees: Kyoto University, Kyoto (JP); TDK Corporation, Tokyo (JP)

( * ) Notice: Subject to any disclaimer, the term of this patent is extended or adjusted under 35 U.S.C. 154(b) by 344 days.

(21) Appl. No.: 11/886,502

(22) PCT Filed: Mar. 7, 2006

(86) PCT No.: PCT/JP2006/304394

§ 371 (c)(1), (2), (4) Date: Sep. 17, 2007

(87) PCT Pub. No.: WO2006/100905

PCT Pub. Date: Sep. 28, 2006

(65) Prior Publication Data

US 2009/0232441 A1    Sep. 17, 2009

(30) Foreign Application Priority Data

Mar. 18, 2005    (JP)    ............................... 2005/080361

(51) Int. Cl.
G02B 6/00    (2006.01)
(52) U.S. Cl. ........................................................ 385/11
(58) Field of Classification Search ................. None
See application file for complete search history.

(56) References Cited

U.S. PATENT DOCUMENTS 5,526,449 A * 6/1996 Meade et al. ................. 385/14

(Continued)

FOREIGN PATENT DOCUMENTS

EP    1 569 017 A1    8/2005

(Continued)

OTHER PUBLICATIONS

Takayama, Seiichi et al., "2 Jigen Photonic Kessho Slab Henpa Mode Henkanki no Teian," vol. 3, p. 1194 (Mar. 29, 2005).

(Continued)

*Primary Examiner*—Sung H Pak
(74) *Attorney, Agent, or Firm*—Oliff & Berridge, PLC

(57) ABSTRACT

The present invention provides a polarized light mode converter which can be provided within a two-dimensional photonic crystal or can be smoothly connected to a two-dimensional photonic crystal. In a two-dimensional photonic crystal made of a slab-like main body provided with a plurality of different refractive index regions (for example, holes 22) arranged in a lattice in the main body, where the different refractive index regions have a refractive index different from that of the main body, a polarized light conversion waveguide 23 is formed which is comprised of defects of the different refractive index regions arranged linearly whose a cross-sectional shape is asymmetrical in a vertical and in a horizontal direction. The polarized light conversion waveguide 23 can be, for example, realized by providing, on a side of the waveguide, holes 221 and 222 extending in a direction oblique to a the main body surface. TE polarized light propagating through the polarized light conversion waveguide 23 is partially converted into TM polarized light due to the asymmetry of the cross-sectional shape of the waveguide. Since the polarized light mode converter is made of a two-dimensional photonic crystal, it can be provided within a two-dimensional photonic crystal or can be smoothly connected to a two-dimensional photonic crystal.

9 Claims, 11 Drawing Sheets

U.S. PATENT DOCUMENTS

| | | |
|---|---|---|
| 6,738,551 B2 | 5/2004 | Noda et al. |
| 6,785,454 B2 * | 8/2004 | Abe .......................... 385/123 |
| 6,917,744 B2 * | 7/2005 | Koyama ..................... 385/131 |
| 2002/0009277 A1 | 1/2002 | Noda et al. |
| 2002/0105000 A1 | 8/2002 | Abe |

FOREIGN PATENT DOCUMENTS

| | | |
|---|---|---|
| JP | A 2001-272555 | 10/2001 |
| JP | A 2002-189135 | 7/2002 |
| JP | A 2004-233941 | 8/2004 |
| JP | A 2004-294517 | 10/2004 |
| JP | B2 3682289 | 5/2005 |
| JP | A 2005-250202 | 9/2005 |
| WO | WO 03/062909 A2 | 7/2003 |

OTHER PUBLICATIONS

Tanaka, Yoshinori et al., "2 Jigen Photonic Kessho Slab Henpa Henkanki no Sakusei," Japan Society of Applied Physics, vol. 3, p. 912 (Sep. 7, 2005).

* cited by examiner

Fig. 3
(a)
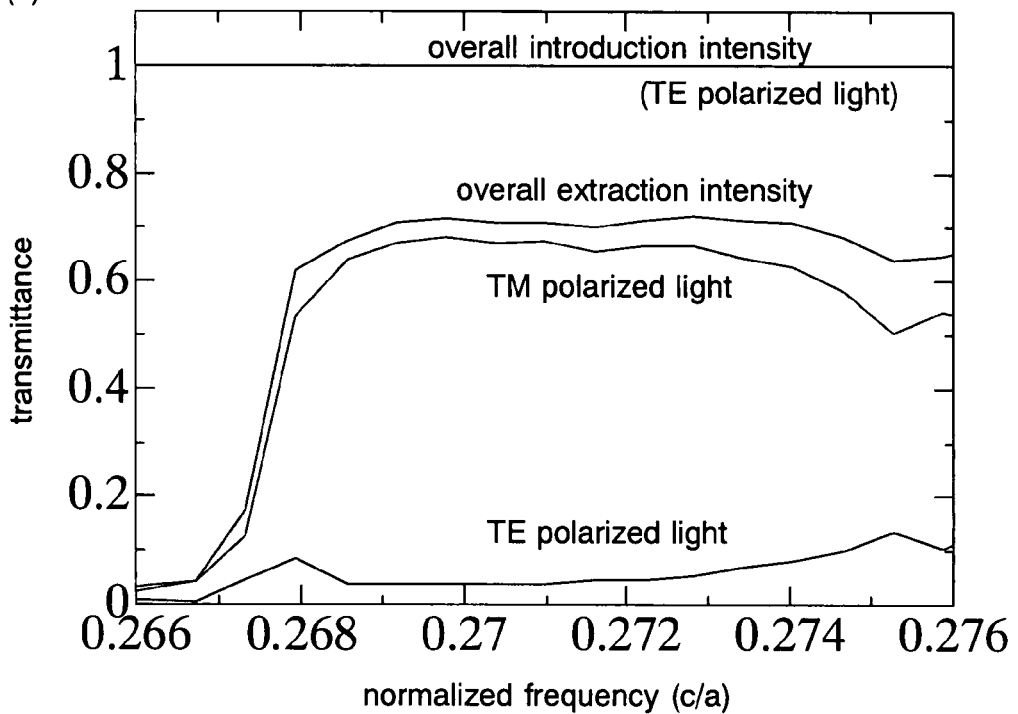
(b)
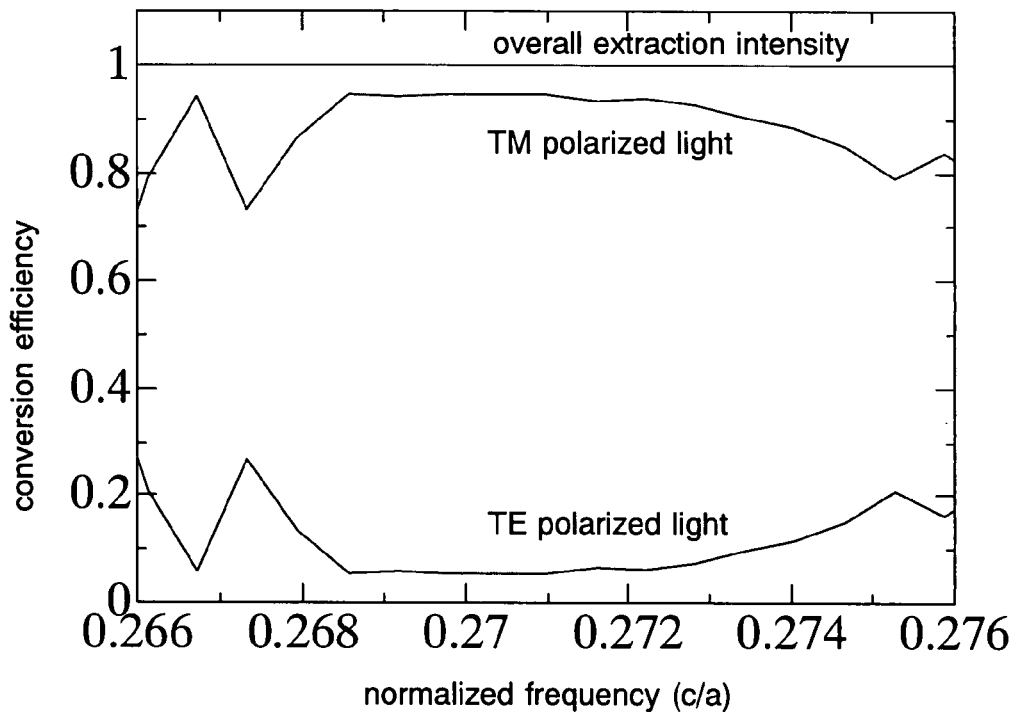

| | maximum transmittance | maximum conversion efficiency |
|---|---|---|
| ○ K=2, M=2 | 0.75 | 0.95 |
| K=5, M=1 | 0.80 | 0.05 |
| K=5, M=2 | 0.65 | 0.02 |
| K=5, M=3 | 0.50 | 0.20 |
| K=5, M=4 | 0.40 | 0.05 |
| ○ K=6, M=2 | 0.75 | 0.95 |
| K=10, M=1 | 0.80 | 0.25 |
| ○ K=10, M=2 | 0.75 | 0.95 |
| ○ K=10, M=3 | 0.70 | 0.90 |
| K=11, M=3 | 0.60 | 0.02 |
| ○ K=14, M=2 | 0.70 | 0.95 |

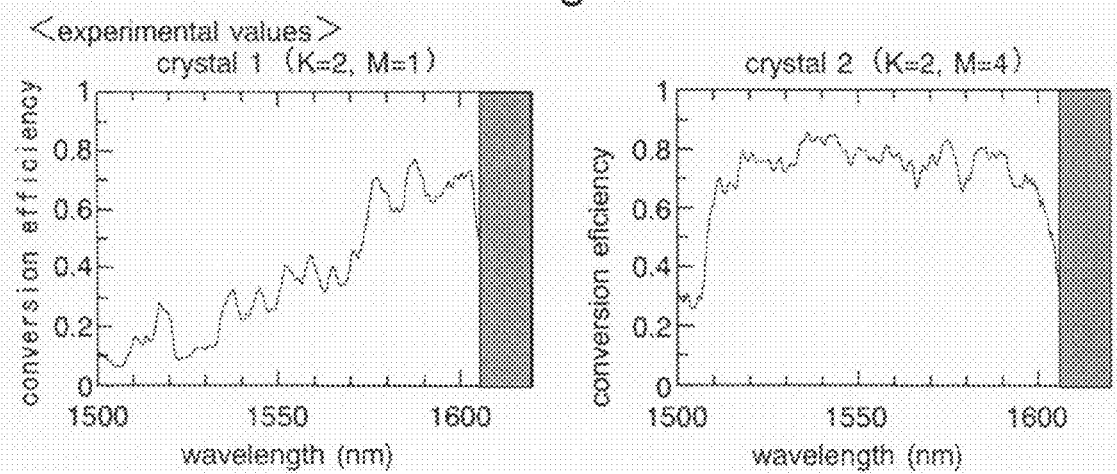
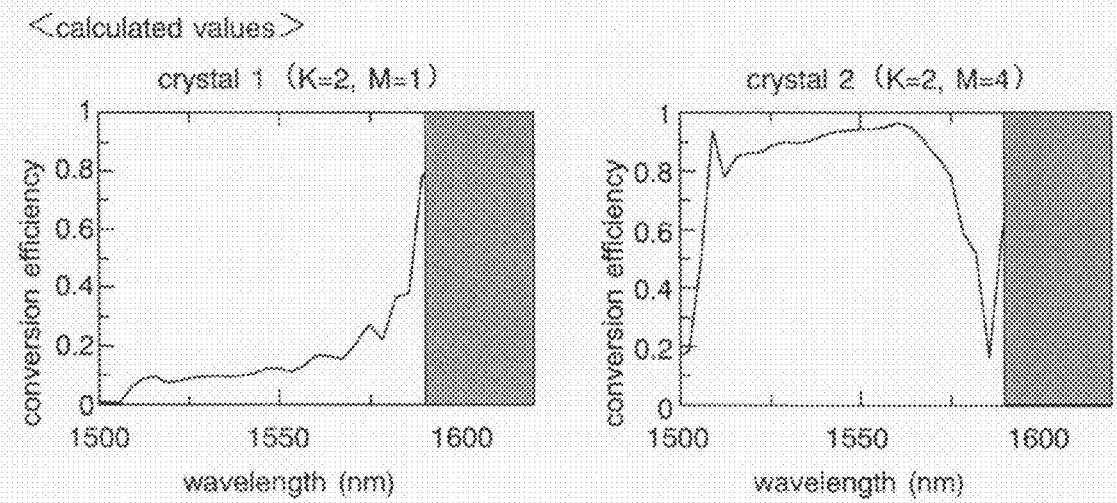

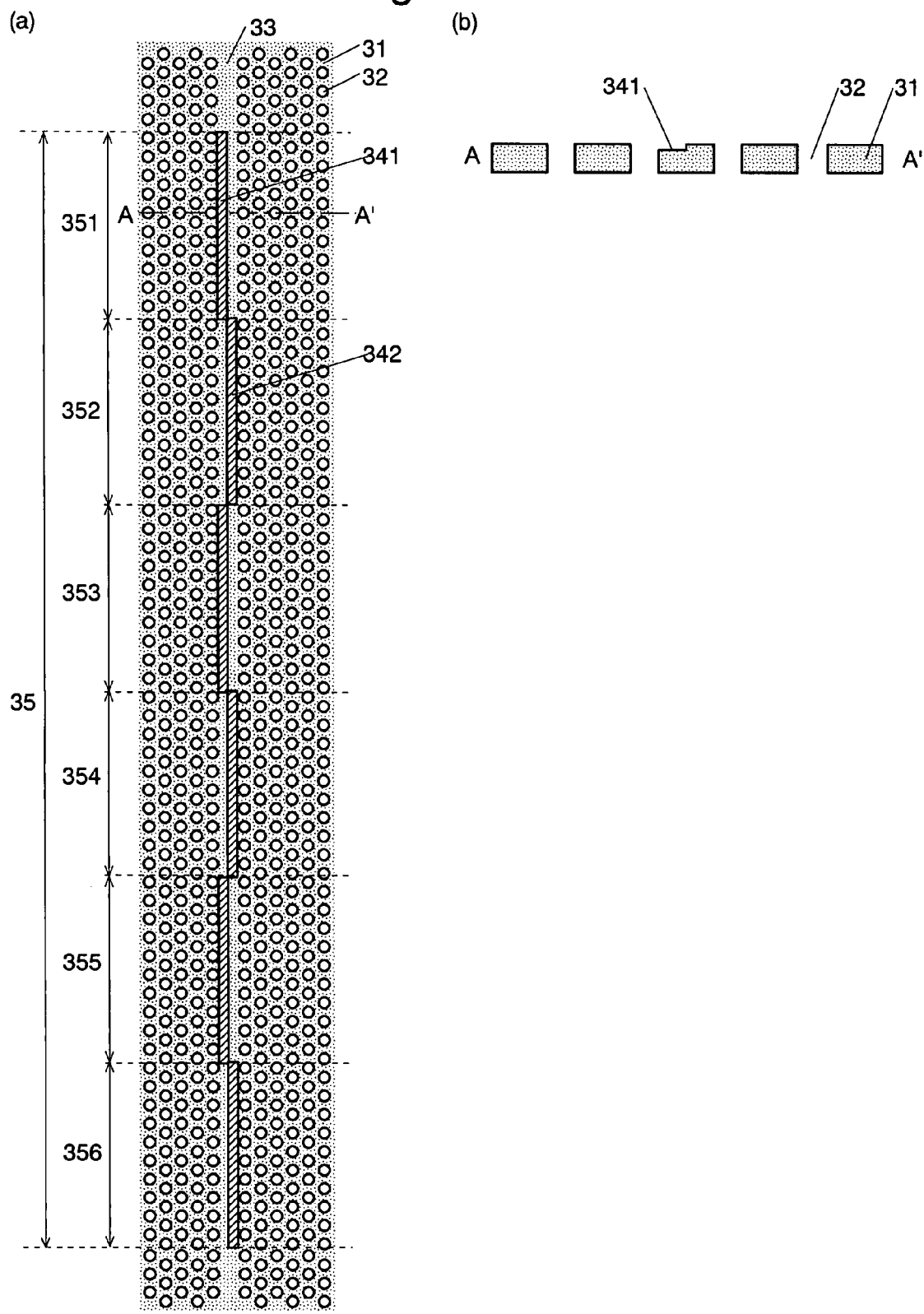

POLARIZED LIGHT MODE CONVERTER

TECHNICAL FIELD

The present invention relates to polarized light mode converter that converts polarized light between TE polarized light and TM polarized light, and more specifically to polarized light mode converter using a two-dimensional photonic crystal. This polarized light mode converter can be preferably used for polarized light control in an optical multiplexer/demultiplexer and other devices using a two-dimensional photonic crystal.

BACKGROUND ART

Optical communication is a method of communication playing a central role of future broadband communications. Thus, for a widespread use of such communication, there have been demands for achieving higher performance, downsizing, and price reduction of optical components used in an optical communication system. One of potential candidates for a next-generation optical communication component that satisfies such demands is an optical communication device using a photonic crystal. This has been already partially in practical use, such as a photonic crystal fiber for polarization dispersion compensation and the like. Further, development of an optical multiplexer/demultiplexer or other kinds of devices used for wavelength division multiplexing (WDM) has been currently promoted for practical use.

A photonic crystal is made of a dielectric body provided with a periodic structure. This periodic structure is typically formed by periodically arranging, in a dielectric main body, regions ("different refractive index regions") having a refractive index different from that of the dielectric main body. The periodic structure forms a band structure related to optical energy in the crystal, thereby forming an energy region where light propagation is impossible. Such an energy region is called "Photonic Band Gap (PBG)".

By providing an appropriate defect in this photonic crystal, an energy level ("defect level") is formed in the PBG, so that only light of a frequency (or wavelength) corresponding to the defect level can exist near the defect. A defect formed in a point-like shape can be used as an optical resonator for light of the frequency, and a defect linearly formed can be used as a waveguide.

As one example of the technology described above, Patent Document 1 describes a two-dimensional photonic crystal having different refractive index regions periodically arranged in a main body (slab) thereof and having a waveguide formed by linearly providing a defect in the periodic arrangement and also a resonator formed by providing a point-like defect adjacently to this waveguide. This two-dimensional photonic crystal functions as a demultiplexer that extracts, to the outside, the light of the frequency corresponding to a resonance frequency of the resonator, out of light of various frequencies propagating through the waveguide. This two-dimensional photonic crystal also functions as a multiplexer that introduces aforementioned light from the outside to the waveguide.

Many two-dimensional photonic crystals, including the one described in Patent Document 1, are designed so that the PBG is formed large for either one of TE polarized light, in which the electric field oscillates in parallel to the main body, and TM polarized light, in which the magnetic field oscillates in parallel to the main body. In either case, the PBG may not be formed for the other polarized light or, even if it is formed, optimum condition may not be necessarily provided for the aforementioned other polarized light.

For example, in a case where a photonic crystal is designed so that a PBG (TE-PBG) is formed for TE polarized light, and a defect level (or resonance frequency) is provided by a point-like defect (or resonator) in the TE-PBG, a PBG for TM polarized light (TM-PBG) may not be formed in a frequency region of this TE-PBG. In this case, TM polarized light having this resonance frequency does not resonate with this resonator. Thus, in demultiplexing, the light of this resonance frequency from among light passing through a waveguide provided near this resonator, TE polarized light can be extracted almost completely while TM polarized light cannot be extracted, thus resulting in poor demultiplexing efficiency. The same applies to multiplexing.

[Patent Document 1] Unexamined Japanese Patent Publication No. 2001-272555 ([0023] to [0027] and [0032], and FIGS. 1 and 5 to 6).

DISCLOSURE OF THE INVENTION

Problem to be Solved by the Invention

In order to reduce such loss of TM polarized light in the resonator and enhance the demultiplexing efficiency, TM polarized light may be previously removed from light passing through the waveguide by using a polarized light filter. However, this only moves the loss from inside of a two-dimensional photonic crystal to the polarization filter.

Thus, it is possible to previously convert the TM polarized light into the TE polarized light by using polarized light mode converter. However, the use of the polarized light mode converter as a separate unit from the two-dimensional photonic crystal creates needs for connecting together this polarized light mode converter and the two-dimensional photonic crystal, thus resulting in possibility of loss at this connection area. Thus, it is desirable that the polarized light mode converter be formed inside the two-dimensional photonic crystal or be so constructed as to be suitable for smoothly (that is, with almost no loss of a target electromagnetic wave) connected to the two-dimensional photonic crystal.

An object of the present invention is to provide a polarized light mode converter which can be provided within a two-dimensional photonic crystal or which can be smoothly connected to a two-dimensional photonic crystal.

Means for Solving the Problem

To achieve the object described above, a polarized light mode converter according to the present invention includes:

(a) a two-dimensional photonic crystal made of a slab-like body provided with a plurality of different refractive index regions arranged in a lattice in the main body having a different refractive index from that of the main body; and (b) a polarized light conversion waveguide which is comprised of a defect of the different refractive index regions arranged linearly and whose cross-sectional shape is asymmetrical in vertical and horizontal directions.

The "cross-section" of the waveguide herein refers to a surface perpendicular to a longitudinal direction of the waveguide. In addition, the "vertical direction" refers to a direction perpendicular to the main body, and the "horizontal direction" refers to a width direction of the waveguide. They are used for convenience in specifying directions, and the polarized light mode converter of the present invention can be arranged in arbitrary orientation for use.

In the polarized light mode converter described above, a plurality of polarized light conversion waveguides may be connected together, where the sectional shapes of the plurality of polarized light conversion waveguides are different from each other.

The cross-sectional shape described above can be made asymmetrical, for example, in the following manners:

(1) providing, on a side of the waveguide, a different refractive index region extending in a direction oblique to a surface of the main body;

(2) making a part of the main body in the waveguide to have a different thickness from thicknesses of other regions; and (3) providing, on one side of the waveguide, a different refractive index region having a vertically asymmetrical shape.

In addition, a plurality of them may be combined together.

By using the polarized light mode converter described above, an optical multiplexer/demultiplexer equipped with a polarized light mode converter can be formed which utilizes only either one of TE polarized light and TM polarized light. An optical multiplexer/demultiplexer equipped with a polarized light mode converter according to a first aspect of the present invention includes:

a) a first and a second two-dimensional photonic crystal optical multiplexers/demultiplexers having a waveguide for conducting light of a predetermined frequency, and a resonator provided near the waveguide and resonating with predetermined polarized light of the frequency; and b) the polarized light mode converter according to any of claims 1 to 5 which, provided between the two two-dimensional photonic crystal optical multiplexers/demultiplexers, for converting polarized light of the frequency.

The optical multiplexer/demultiplexer equipped with a polarized light mode converter according to a second aspect of the present invention includes:

(a) a two-dimensional photonic crystal optical multiplexer/demultiplexer having a waveguide for conducting light of a predetermined frequency, and a resonator provided near the waveguide and resonating with predetermined polarized light of the frequency;

(b) a reflection section for reflecting polarized light of the frequency; and (c) the polarized light mode converter according to any of claims 1 to 5, provided between the two-dimensional photonic crystal optical multiplexer/demultiplexer, and the reflection section, for converting polarized light of the frequency.

In the optical multiplexer/demultiplexer equipped with a polarized light mode converter of the first aspect, two-dimensional photonic crystal reflectors for reflecting the polarized light of the predetermined frequency can be provided respectively: between the first two-dimensional photonic crystal optical multiplexer/demultiplexer and the polarized light mode converter; and on a side opposite to the polarized light mode converter of the second two-dimensional photonic crystal optical multiplexer/demultiplexer.

A multistage optical multiplexer/demultiplexer equipped with a polarized light mode converter according to the present invention, in addition to the optical multiplexer/demultiplexer equipped with a polarized light mode converter of the first aspect described above, is made of a plurality of serially connected polarized light mode conversion optical multiplexers/demultiplexers, where a two-dimensional photonic crystal reflector for reflecting the polarized light of the predetermined frequency is provided between the first two-dimensional photonic crystal optical multiplexer/demultiplexer and the polarized light mode converter. In each of the optical multiplexer/demultiplexer equipped with a polarized light mode converters, all waveguides located on an upstream side of the two-dimensional photonic crystal reflector are so formed as to permit passage, therethrough, of polarized light of a frequency resonating with a resonator of the first photonic crystal optical multiplexer/demultiplexer located adjacently to the two-dimensional photonic crystal reflector, and the waveguide of the first photonic crystal optical multiplexer/demultiplexer is so formed as to reflect polarized light of a frequency resonating with a resonator of the second photonic crystal optical multiplexer/demultiplexer located adjacently on an upstream side of the first photonic crystal optical multiplexer/demultiplexer.

MODES FOR CARRYING OUT THE INVENTION AND THEIR EFFECTS

A polarized light mode converter of the present invention is formed in a two-dimensional photonic crystal which is made of a slab-like main body provided with a plurality of different refractive index regions arranged in a from of a lattice in a main body, where the different refractive index regions have a refractive index different from that of the main body, which is the same as conventional ones. In this two-dimensional photonic crystal, a waveguide is formed by linearly providing defects of the different refractive index regions. The cross-sectional shape of this waveguide is made to be asymmetrical in both vertical and horizontal directions.

Upon incidence of TE polarized light from one end of such a waveguide, due to the asymmetry of the cross-sectional shape of this waveguide, TM polarized light is excited, and extracted as TM polarized light at the other end. Similarly, upon incidence of TM polarized light from one end of this waveguide, TE polarized light is excited, and extracted as the TE polarized light at the other end. In this manner, the waveguide having the configuration described above can convert at least part of the TE polarized light and the TM polarized light into the other polarized light. Therefore, this waveguide serves as a polarized light conversion waveguide.

The cross-sectional shape of the waveguide can be made asymmetrical in the vertical and horizontal directions, for example, in the following manner. In a first example, in a two-dimensional photonic crystal where different refractive index regions are formed perpendicularly to the main body surface, a different refractive index region ("oblique different refractive index region") extending in a direction oblique to the main body surface is provided on a side of the waveguide. The oblique different refractive index region may be provided only on one side of the waveguide, or may be provided on both sides asymmetrically.

In the second example, a part of the main body in the waveguide is made to have a different thickness from those of the other regions. Such a waveguide can be made by, for example, forming a groove in parallel to the waveguide at a position off the center of the waveguide, or by adding a member in parallel to the waveguide at the position.

In the third example, a vertically asymmetrical different refractive index region is provided on one side of the waveguide. The cross-sectional shape of the waveguide is vertically asymmetrical due to the asymmetrical shape of this different refractive index region, and horizontally asymmetrical by providing this different refractive index region only on one side of the waveguide. For the different refractive index region having a vertically asymmetrical shape, for example, one having a step inside or one whose size varies continuously in a vertical direction can be used.

Light propagating through a waveguide leaks, in some degrees, from the width ends of the linear defect; thus, the vertically and horizontally asymmetrical waveguide can also be formed by adjusting not only the linear defect portion or the different refractive index regions adjacent to this linear defect but also the shapes of the main body and different refractive index regions within the range in which this light leaks. For example, in arranging the different refractive index regions in the form of a triangular grid, the vertically and horizontally asymmetrical waveguide can be formed by adjusting the shape of a region approximately three rows of different refractive index regions away from the linear defect in the width direction.

A plurality of polarized light conversion waveguides of different cross-sectional shapes may be connected together to form one polarized light conversion waveguide. In this application, such a polarized light conversion waveguide is referred to as "multistage polarized light conversion waveguide". Through appropriate selection of the cross-sectional shape of each stage and their connection, the multistage polarized light conversion waveguide can provide a high polarized light conversion efficiency as described below.

The polarized light mode converter of the present invention can be incorporated, as part of an optical functional element of a two-dimensional photonic crystal, into the two-dimensional photonic crystal. Here, polarized light mode conversion optical multiplexers/demultiplexers of the first and second aspects will be described as examples.

The optical multiplexer/demultiplexer equipped with a polarized light mode converter of the first aspect has the aforementioned polarized light mode converter provided between two optical multiplexers/demultiplexers (first optical multiplexer/demultiplexer and second optical multiplexer/demultiplexer) made of two-dimensional photonic crystals. Both optical multiplexers/demultiplexers respectively have: a waveguide for conducting light of a predetermined frequency; and, in the vicinity thereof, a resonator resonating with predetermined polarized light having this predetermined frequency. Many two-dimensional photonic crystals have a photonic band gap formed for only either one of TE polarized light and TM polarized light; thus, the resonator also resonates with light of only either one of the TE polarized light and the TM polarized light.

The waveguide of the first optical multiplexer/demultiplexer, the waveguide of the second optical multiplexer/demultiplexer, and the polarized light mode converters are connected together so that these waveguides and the polarized light conversion waveguide are oriented in series.

In the above description, for convenience of explanation, it is supposed that the first optical multiplexer/demultiplexer and the polarized light mode converter, and the second optical multiplexer/demultiplexer and the polarized light mode converter are connected together, but they can be actually formed integrally with one two-dimensional photonic crystal.

An operation of the optical multiplexer/demultiplexer equipped with a polarized light mode converter of the first aspect will be described. Here, the description refers to an example where a resonator resonating with TE polarized light is provided in the first optical multiplexer/demultiplexer and the second optical multiplexer/demultiplexer, that is, a case where TE polarized light is demultiplexed. To the waveguide of the first optical multiplexer/demultiplexer, multiplexed light of a plurality of frequencies is introduced. Of this multiplexed light, TE polarized light of a frequency resonant with the resonator of the first optical multiplexer/demultiplexer is extracted from the waveguide to the resonator. At this point, TM polarized light having this resonance frequency passes without being extracted by the resonator. The light which has passed through the resonator of the first optical multiplexer/demultiplexer is introduced to the polarized light conversion waveguide of the polarized light mode converter. Here, at least part of the TM polarized light of the aforementioned resonance frequency is converted into TE polarized light. The multiplexed light of this resonance frequency including the light converted to the TE polarized light is introduced to the waveguide of the second optical multiplexer/demultiplexer. Of this light, the light of the aforementioned resonance frequency converted to the TE polarized light is extracted by the resonator of the second optical multiplexer/demultiplexer. In this manner, the TE polarized light of the aforementioned resonance frequency are respectively extracted from the first optical multiplexer/demultiplexer and the second optical multiplexer/demultiplexer. With this optical multiplexer/demultiplexer equipped with a polarized light mode converter, a part of light of the resonance frequency that cannot be extracted from the resonator of the first optical multiplexer/demultiplexer can be extracted from the resonator of the second optical multiplexer/demultiplexer by subjecting this part of light to polarized light conversion by the polarized light mode converter, providing better demultiplexing efficiency than is provided by an optical multiplexer/demultiplexer with no polarized light mode converter.

Note that the same operation applies to a case where a resonator resonating with TM polarized light is provided in the first optical multiplexer/demultiplexer and the second optical multiplexer/demultiplexer, that is, a case where the TM polarized light is demultiplexed.

The optical multiplexer/demultiplexer equipped with a polarized light mode converter of the second aspect has, in the optical multiplexer/demultiplexer equipped with a polarized light mode converter of the first aspect, a reflection section for reflecting light of the resonance frequency of the resonator of the first optical multiplexer/demultiplexer instead of the second optical multiplexer/demultiplexer. As the reflection section, a normal mirror, such as a metal mirror, can be used. The optical multiplexer/demultiplexer equipped with a polarized light mode converter of the second aspect has only one two-dimensional photonic crystal optical multiplexer/demultiplexer, which is referred to as "first optical multiplexer/demultiplexer" for convenience.

An operation of the optical multiplexer/demultiplexer equipped with a polarized light mode converter of the second aspect will be described, referring to a case where TE polarized light is demultiplexed. Upon introduction of multiplexed light of a plurality of frequencies to the waveguide of the first optical multiplexer/demultiplexer, of this multiplexed light, TE polarized light resonant with the resonator of the first optical multiplexer/demultiplexer is extracted from the waveguide to the resonator. The light which has passed through the resonator of the first optical multiplexer/demultiplexer is introduced to the polarized light conversion waveguide of the polarized light mode converter, reflected on the reflection section, and then returns to the waveguide of the first optical multiplexer/demultiplexer again through the polarized light conversion waveguide. Meanwhile, a part of TM polarized light is converted into TE polarized light. The light of the resonance frequency converted to TE polarized light is extracted from the waveguide to the resonator of the first optical multiplexer/demultiplexer.

In this manner, not only the TE polarized light of the resonance frequency introduced to the first optical multiplexer/demultiplexer but also a part of the TM polarized light of the resonance frequency similarly introduced to the first optical multiplexer/demultiplexer is converted by the polarized light mode converter into TE polarized light and then extracted from the resonator of the first optical multiplexer/demultiplexer, thus providing better demultiplexing efficiency than is provided by an optical multiplexer/demultiplexer having no polarized light mode converter. Moreover, in this optical multiplexer/demultiplexer equipped with a polarized light mode converter, unlike the one of the first aspect, it is only necessary to provide one resonator for one frequency and polarized light.

In the optical multiplexer/demultiplexer equipped with a polarized light mode converter of the first aspect, between the first optical multiplexer/demultiplexer and the polarized light mode converter, a first two-dimensional photonic crystal reflector may be provided which reflects polarized light of a frequency resonant with the resonator of the first optical multiplexer/demultiplexer. Here, it is designed so that the other polarized light having this resonance frequency can pass through the first two-dimensional photonic crystal reflector. Moreover, on a side opposite to the polarized light mode converter of the second optical multiplexer/demultiplexer, a second two-dimensional photonic crystal reflector may be provided which reflects polarized light of a frequency resonating with the resonator of the second optical multiplexer/demultiplexer.

Some of such two-dimensional photonic crystal reflectors, for example, have a waveguide formed by arranging different refractive index regions at predetermined repetition cycles different from those of the first and second optical multiplexers/demultiplexers. Between two-dimensional photonic crystals having different cycles of different refractive index regions, the frequency band for light that can pass through the waveguide is also different. Taking advantage of this, the cycles of the different refractive index regions are determined so that the aforementioned frequency is included in the waveguide passage frequency bands of the first and second two-dimensional photonic crystals but not included in the waveguide passage frequency bands of the first and second two-dimensional photonic crystal reflectors. Such a two-dimensional photonic crystal is disclosed in Unexamined Japanese Patent Publication No. 2004-233941. As a result, the aforementioned polarized light of the aforementioned resonance frequency propagating through the waveguide of the first optical multiplexer/demultiplexer cannot propagate through the waveguide of the first two-dimensional photonic crystal reflector and is reflected at a boundary between the first optical multiplexer/demultiplexer and this reflector. The other polarized light passes through the waveguide of the two-dimensional photonic crystal reflector and a part of it is converted into the aforementioned polarized light in the polarized light mode converter. This converted light, light of the aforementioned resonance frequency propagating through the waveguide of the second optical multiplexer/demultiplexer is reflected at a boundary between the second optical multiplexer/demultiplexer and the second two-dimensional photonic crystal reflector.

In each of the first optical multiplexer/demultiplexer and the second optical multiplexer/demultiplexer, the polarized light of the resonance frequency that has passed through this resonator without being captured by the resonator is reflected by the two-dimensional photonic crystal reflector and introduced to this resonator. Consequently, this optical multiplexer/demultiplexer equipped with a polarized light mode converter can achieve even better demultiplexing efficiency.

A plurality of polarized light mode conversion optical multiplexers/demultiplexers having a two-dimensional photonic crystal reflector between the first optical multiplexer/demultiplexer and the polarized light mode converter can be serially connected together. For the reason to be described later, the two-dimensional photonic crystal reflector does not have to be provided on the side opposite to the polarized light mode converter of the second optical multiplexer/demultiplexer. The waveguide of each optical multiplexer/demultiplexer equipped with a polarized light mode converter is so formed as to satisfy the following conditions.

First, all the waveguides located on an upstream side of each two-dimensional photonic crystal reflector (including the waveguide of the other optical multiplexer/demultiplexer equipped with a polarized light mode converter) are so formed as to permit passage, therethrough, of polarized light of a frequency resonating with the resonator of the first optical multiplexer/demultiplexer located adjacently to this two-dimensional photonic crystal reflector. Here, to the waveguide, multiplexed light of a plurality of frequencies flows from the first optical multiplexer/demultiplexer side to a second optical multiplexer/demultiplexer side of each optical multiplexer/demultiplexer equipped with a polarized light mode converter in a case of demultiplexing; thus, the first optical multiplexer/demultiplexer side adjacent to this two-dimensional photonic crystal reflector is called "upstream side".

Moreover, in each optical multiplexer/demultiplexer equipped with a polarized light mode converter, the waveguide of the first optical multiplexer/demultiplexer is so formed as to reflect polarized light of a frequency resonating with the resonator of the second optical multiplexer/demultiplexer located adjacently on an upstream side of the first optical multiplexer/demultiplexer. Therefore, since this first optical multiplexer/demultiplexer also plays a role as a two-dimensional photonic crystal reflector, it is not necessary to provide a two-dimensional photonic crystal reflector on a downstream side of the second optical multiplexer/demultiplexer. This adjacent second optical multiplexer/demultiplexer is provided not in the optical multiplexer/demultiplexer equipped with a polarized light mode converter to which this first optical multiplexer/demultiplexer belongs but in the optical multiplexer/demultiplexer equipped with a polarized light mode converter located adjacently on an upstream side thereof.

An operation of the multistage optical multiplexer/demultiplexer equipped with a polarized light mode converter formed in this manner will be described referring to an example where TE polarized light is demultiplexed. The same operation applies to a case where TM polarized light is demultiplexed.

First, the operation in the optical multiplexer/demultiplexer equipped with a polarized light mode converter will be described. To the waveguide of the first optical multiplexer/demultiplexer, multiplexed light of a plurality of frequencies is introduced. The resonator of the first optical multiplexer/demultiplexer captures and demultiplexes TE polarized light of this resonance frequency. However, a part of this TE polarized light of the resonance frequency is not captured by the resonator and passes through the waveguide. The two-dimensional photonic crystal reflector reflects this passage light, and the resonator of the first optical multiplexer/demultiplexer captures and demultiplexes this reflection light. TE polarized light of the other frequencies and TM polarized light including this resonance frequency pass through the waveguides of the first optical multiplexer/demultiplexer and the two-dimensional photonic crystal reflector.

Next, the polarized light mode converter converts a part of the multiplexed light from TM polarized light into TE polarized light. The resonator of the second optical multiplexer/demultiplexer captures and demultiplexes the light of this resonance frequency converted to TE polarized light. However, a part of the TE polarized light of this resonance frequency passes through without being captured by the resonator. The first optical multiplexer/demultiplexer of the optical multiplexer/demultiplexer equipped with a polarized light mode converter located adjacently on a downstream side thereof reflects this passage light, and the resonator of the second optical multiplexer/demultiplexer captures and demultiplexes this reflection light.

The polarized light mode conversion optical multiplexers/demultiplexers located at the second position and thereafter each demultiplexes, in the same manner as the first optical multiplexer/demultiplexer equipped with a polarized light mode converter, TE polarized light which has passed through the immediately preceding optical multiplexer/demultiplexer equipped with a polarized light mode converter and which has a resonance frequency of the resonators of the first and second optical multiplexers/demultiplexers.

As described above, in the multistage optical multiplexer/demultiplexer equipped with a polarized light mode converter of the present invention, the light which has passed without being captured by the resonator is reflected by the two-dimensional photonic crystal reflector or the first optical multiplexer/demultiplexer of the optical multiplexer/demultiplexer equipped with a polarized light mode converter located adjacently on a downstream side thereof and captured by the resonator, resulting in even better demultiplexing efficiency.

EFFECTS OF THE INVENTION

The present invention provides a polarized light mode converter which can convert TE polarized light into TM polarized light and TM polarized light into TE polarized light respectively. This polarized light mode converter has a two-dimensional photonic crystal as its mother body, and thus can be incorporated into an optical functional element of a two-dimensional photonic crystal or can be smoothly connected to such an element.

BRIEF DESCRIPTION OF THE DRAWINGS

FIG. 3 is graphs showing calculation results of transmittance and conversion efficiency of the polarized light mode converter of FIG. 2.

FIG. 6 is graphs showing measurement results of a polarized light conversion efficiency of a two-dimensional photonic crystal (crystal 1) having an only one-stage polarized light conversion waveguide and the two-dimensional photonic crystal (crystal 2) having a multistage polarized light conversion waveguide.

FIG. 7 is graphs showing calculation results of polarized light conversion efficiencies of the crystals 1 and 2.

FIG. 8 shows plan and sectional views illustrating the second embodiment of the polarized light mode converter having a multistage polarized light conversion waveguide.

Figure 1:
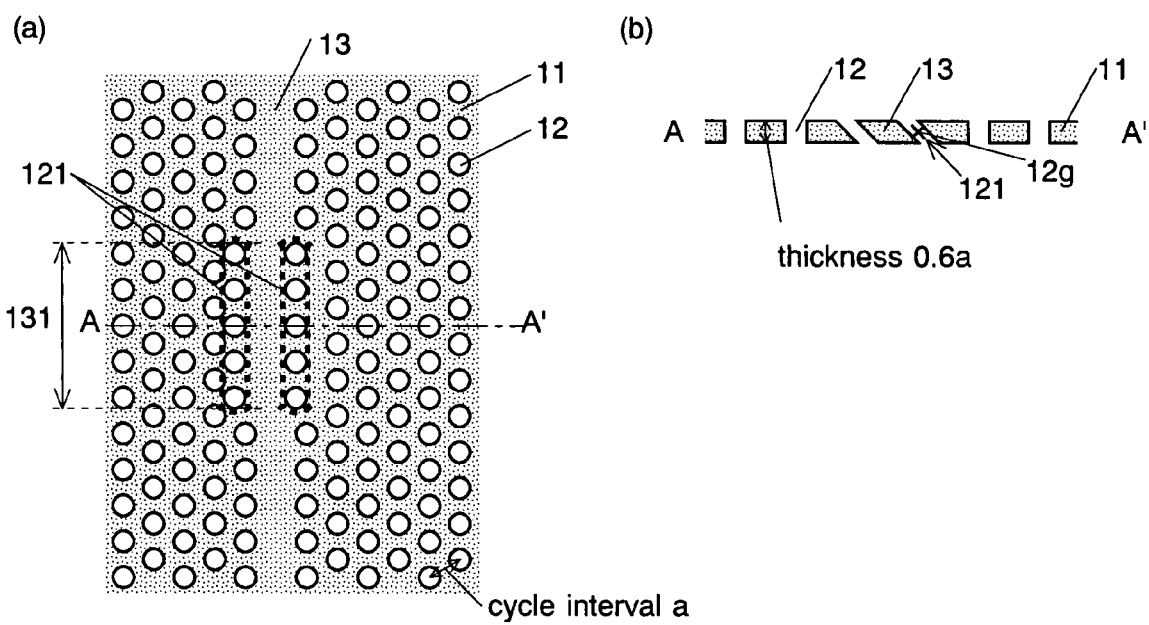
FIG. 1 shows plan and sectional views of one embodiment of the polarized light mode converter of the present invention.

EXPLANATION OF NUMERALS 11, 21, 31, 41: Main body
12, 12a, 22, 32, 42, 421, 57: Holes
121, 122, 221, 222: Oblique holes
12g: Gravity center
13, 23, 33, 43, 76, 82: Waveguide
131, 241-244, 351-356, 431, 54: Polarized light conversion waveguide
24, 35, 78: Multistage polarized light conversion waveguide
341, 342: Groove
51, 61, 71: First optical multiplexer/demultiplexer
52, 72: Second optical multiplexer/demultiplexer
53, 63: Multistage polarized light mode converter
55, 65: Waveguide of optical multiplexer/demultiplexer
56, 66, 771, 772: Resonator
67: Reflection mirror
73: Polarized light mode converter
74: Two-dimensional photonic crystal reflector
791, 792: Waveguide passage of frequency band
793: Frequency band
811, 812: Optical multiplexer/demultiplexer equipped with a polarized light mode converter
831, 832: Resonator
881, 882: Waveguide passage frequency band

EMBODIMENTS

The embodiments of a polarized light mode converter of the present invention will be described referring to FIGS. 1 to 9. FIG. 1 shows (a) a plan view and (b) a sectional view taken along a line A-A' of the plan view, illustrating one embodiment of the polarized light mode converter of the present invention. On a slab-like main body 11, cylindrical holes 12 extending in a direction perpendicular to the main body 11 are arranged in the form of a triangular lattice. In the present embodiment, the cycle interval of the holes 12 is determined as a, the radius of a hole 12 is determined as 0.29a, and the thickness of the main body 11 is determined as 0.6a. No hole 12 (lack of holes 12) is provided in one row of lattice points of this triangular lattice so that a waveguide 13 is formed. Further, five holes each on both sides (right side and left side) of the waveguide 13 are formed into oblique cylinders (oblique holes 121) that are tilted laterally to the waveguide 13 at an angle of 45° to the main body 11. Here, tilt directions of the oblique holes 121 on the right side and those on the left side are parallel to each other. The position of the oblique holes 121 on both sides are determined so that the gravity center 12g of each oblique cylinder is on a lattice point of the triangular lattice. Of the waveguide 13, a portion whose both sides are sandwiched by the oblique holes 121 serves as a polarized light conversion waveguide 131.

In FIG. 1, the cross-sectional shape of the waveguide 13 except the polarized light conversion waveguide 131 is in line-symmetry with respect to the center line in both vertical and horizontal directions due to the perpendicular arrangement of the holes 12 with respect to the main body 11. By contrast, due to the oblique holes 121 provided on both sides with the orientations in parallel to each other, the cross-sectional shape of the polarized light conversion waveguide 131 has no symmetry in the vertical and horizontal directions. Due to such a cross-sectional shape, upon incidence of TE polarized light from one end of the polarized light conversion waveguide 131, TM polarized light is excited and upon incidence of TM polarized light, TE polarized light is excited. The excited light is extracted from the other end of the polarized light conversion waveguide 131. In this manner, the waveguide having the configuration described above can convert at least a part of TE polarized light and TM polarized light into the other polarized light.

This polarized light mode converter can be manufactured by: forming the holes 12 perpendicular to the main body 11 using a method employed in manufacturing normal two-dimensional photonic crystals (for example, method described in Patent Document 1); and forming the oblique holes 121 using anisotropic etching. The anisotropic etching can be performed by: a method of plasma etching in which plasma gas is controlled to a predetermined direction by an electric field and injected to a subject to be processed; by a method of using a focused ion beam; or the like. Position adjustment of the holes 12 and the oblique holes 121 can be performed by a method conventionally used in an ordinary semiconductor manufacturing field.

Figure 2:
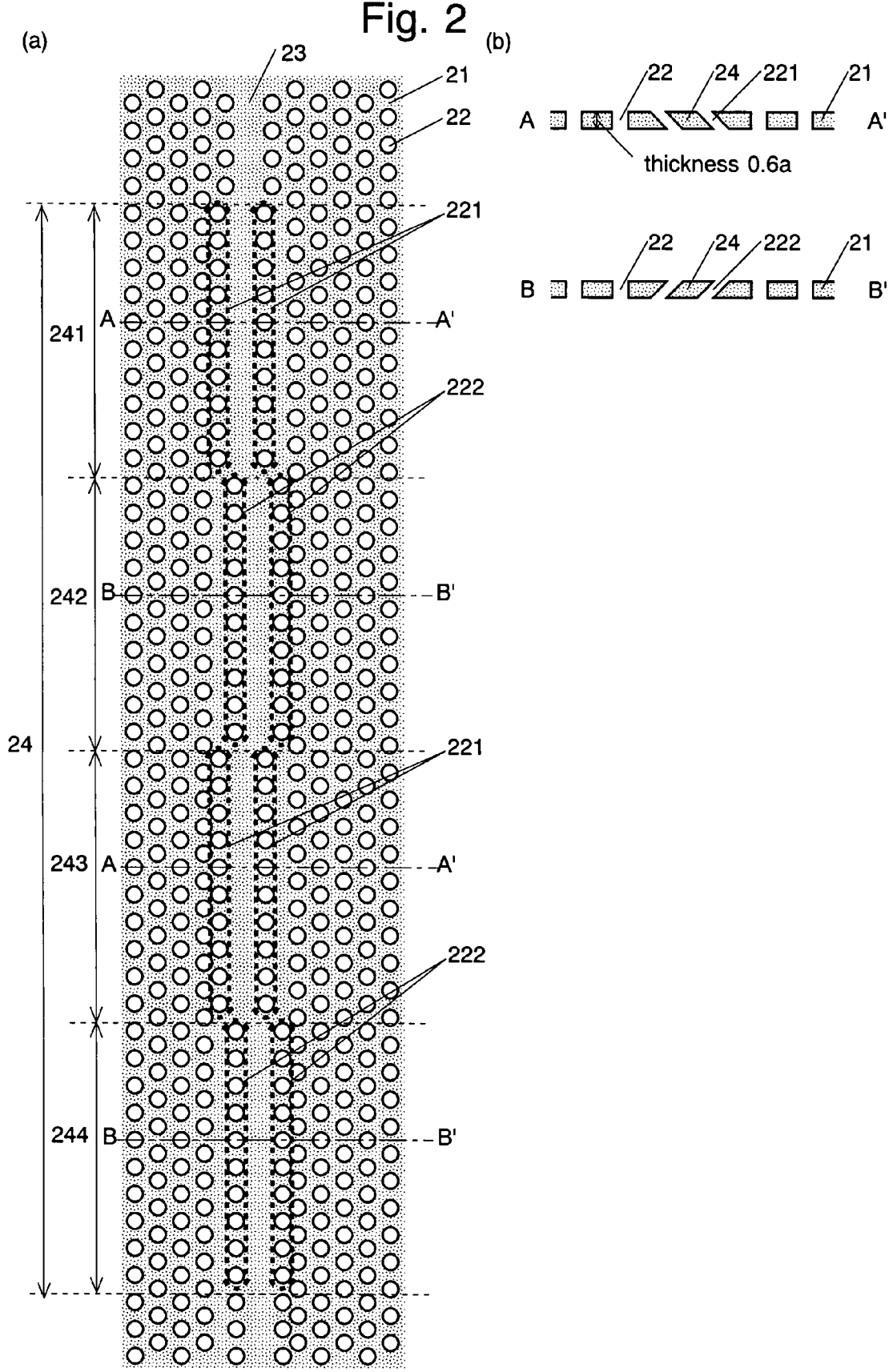
FIG. 2 shows a plan and sectional views illustrating the first embodiment of the polarized light mode converter having a multistage polarized light conversion waveguide.

FIG. 2 shows the first embodiment of the polarized light mode converter having a plurality of polarized light conversion waveguides (multistage polarized light conversion waveguide) of different cross-sectional shapes, with (a) representing a plan view and (b) representing sectional views taken along lines A-A' and B-B' of the plan view respectively. In FIG. 2(*a*), lines A-A' drawn at two positions provide the same cross-sectional shape. The same applies to the cross sections on lines B-B'.

This polarized light mode converter has a main body 21, holes 22, and a waveguide 23 which are formed in the same manner as the polarized light mode converter of FIG. 1. In addition, the polarized light mode converter has polarized light conversion waveguides 241 and 243 on the both sides of which ten oblique holes 221 each are provided, where the oblique holes 221 are tilted laterally to the waveguide 23 at 45° to the main body 21, similarly to the oblique holes 121 shown in FIG. 1. The polarized light mode converter also has polarized light conversion waveguides 242 and 244 on the both sides of which ten oblique holes 222 each are provided, where the oblique holes 222 are tilted at 45° to the main body 21 but in the direction opposite to that of the oblique holes 221. The polarized light conversion waveguides 241, 242, 243 and 244 are sequentially connected together, thereby forming one multistage polarized light conversion waveguide 24. The cycle interval and radius of the holes 22, the thickness of the main body 21, and the position of the oblique holes 221 and 222 are determined in the same manner as those the polarized light mode converter of FIG. 1.

FIG. 3 shows results of calculation made by using a three-dimensional FDTD method, for a case where TE polarized light is introduced from one end of the waveguide of the polarized light mode converter of FIG. 2.

FIG. 3(*a*) is a graph of an intensity (i.e. transmittance) of TE polarized light and TM polarized light extracted from the other end of the waveguide. FIG. 3(*b*) is a graph of a proportion of TM polarized light among the light extracted (i.e. conversion efficiency) and a proportion of TE polarized light directly extracted. Abscissa of these graphs denotes a normalized frequency obtained by multiplying a frequency by the cycle interval a and then dividing it by the light speed c. From these figures, it can be confirmed that a part of the TE polarized light can be converted into TM polarized light over the entire range of the calculated normalized frequencies (0.266 to 0.276). Within the normalized frequency range of 0.269 to 0.274, approximately 70% of the introduced TE polarized light can be transmitted (overall extraction intensity in FIG. 3(*a*)), and the conversion efficiency, which is the proportion of the TM polarized light in the overall extracted intensity, is 90% or higher (FIG. 3(*b*)). Then, with a normalized frequency of 0.270, a maximum strength of 75% and a maximum conversion efficiency of 95% can be provided.

On a polarized light conversion waveguide with the same structure, since the efficiency of conversion from TE polarized light to TM polarized light is equal to that of conversion from TM polarized light to TE polarized light based on the reciprocity principle of electromagnetic wave propagation, introduction of TM polarized light provides the same results.

Figures 4, 5:
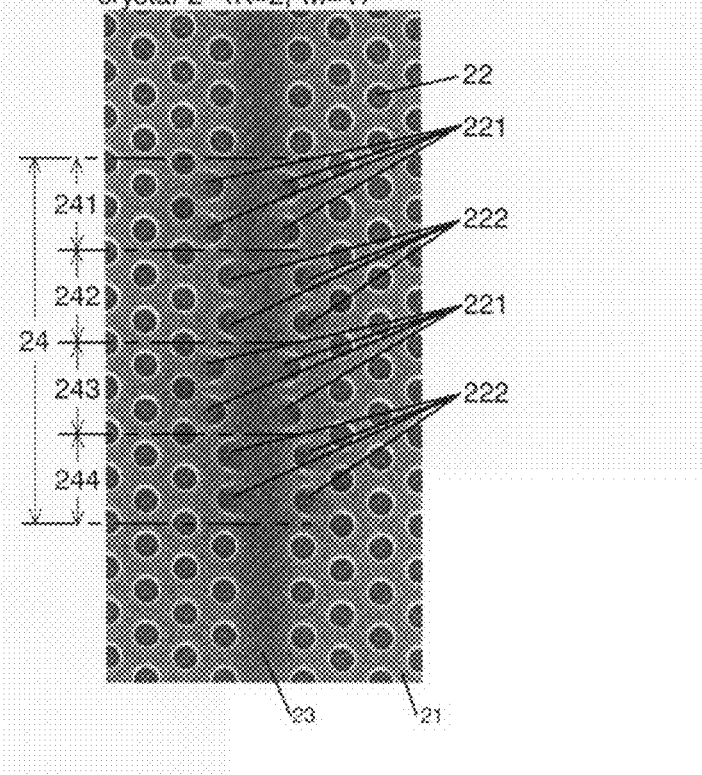
FIG. 4 is a table showing calculation results of maximum transmittance and maximum conversion efficiencies for a plurality of polarized light mode converters.
FIG. 5 is a micrograph of a two-dimensional photonic crystal having a multistage polarized light conversion waveguide.

Next, FIG. 4 shows calculation results of maximum transmittance and maximum conversion efficiencies for a polarized light mode converter having a multistage polarized light conversion waveguide formed by connecting together M pieces (where M is a natural number) of two-stage polarized light conversion waveguides in which a polarized light conversion waveguide with K pieces (where K is a natural number) of oblique holes 221 each provided on both sides of a waveguide is connected to a polarized light conversion waveguide with K pieces of oblique holes 222 each provided on both sides of the waveguide. The calculation results for the polarized light mode converter of FIG. 2 correspond to the case of K=10 and M=2 in the table. When K=2, 6, 10, or 14 and M is 2 or more (marked ○ in the table), the maximum transmittance and the maximum conversion efficiency represent high values, i.e., 70% or more and 90% or more, respectively. Based on this, to obtain high maximum transmittance and maximum conversion efficiencies, it is desirable that M be 2 or more and K be 4n−2 (where n is a natural number).

Next, referring to FIGS. 5 to 7, description will be given on the results of experiments conducted after fabricating a two-dimensional photonic crystal (crystal 1) provided with a polarized light conversion waveguide (only one stage) with K=2 and M=1 and a two-dimensional photonic crystal (crystal 2) provided with a multistage polarized light conversion waveguide with K=2 and M=4.

The crystals 1 and 2 are fabricated in the following manner. First, in an Si layer of a SOI (Silicon on Insulator) substrate comprised of the Si layer and an $SiO_2$ layer, holes 22 other than oblique holes are fabricated by an EB (electron beam) resist patterning method and an ICP (inductive coupled plasma) etching method. Next, the oblique holes 221 and 222 are fabricated by irradiating a surface of the Si layer with a focused ion beam (FIB) in a direction in which the oblique holes to be formed extend. Finally, $SiO_2$ located below the region of the Si layer where the holes and the oblique holes are formed is removed by hydrofluoric acid etching.

FIG. 5 shows an electron micrograph of the crystal 2 photographed from above. Holes 22, oblique holes 221, and oblique holes 222 are all the same as those shown in FIG. 2(*b*).

FIG. 6 shows the results of conversion efficiency measured for the crystals 1 and 2. This measurement is performed by cleaving end surfaces of crystals on a light incidence side and a light exit side of a waveguide 23, injecting a laser beam of TE polarized light converged by an incident condensing lens through the incident cleaved surface and introducing the light exiting from the exit cleaved surface to an optical power meter by using an exit condensing lens and an optical fiber. At this point, with an analyzer placed behind the exit condensing lens, a polarization direction of the exit light is examined. A conversion efficiency on the ordinate of FIG. 6 is, as is the case with the one mentioned above, expressed by a proportion of TM polarized light constituting the overall extraction intensity. Additionally, FIG. 7 shows results of conversion efficiency calculated for the crystals 1 and 2. For the both crystals 1 and 2, the experimental values of FIG. 6 and the calculated values of FIG. 7 are in excellent agreement with each other.

FIGS. 6 and 7 prove that conversion from TE polarized light to TM polarized light is achieved in both of the crystals 1 and 2. In addition, the conversion efficiency is higher for the crystal 1 than that for the crystal 2 on most of the wavelengths. Based on this, it is assumed that use of a multistage polarized light conversion waveguide can enhance the conversion efficiency. In the crystal 2, across a sufficiently wide wavelength band, i.e., wavelengths of 1520 nm to 1590 nm, for use in a WDM wavelength multiplexer/demultiplexer, a conversion efficiency as high as approximately 80% is achieved.

FIGS. 2 to 7 show examples where polarized light conversion waveguides having the oblique holes 221 provided in one direction and polarized light conversion waveguides having the same number of oblique holes 222 provided in another direction are connected alternately in the same numbers. However, the multistage polarized light conversion waveguide of the present invention is not limited thereto. For example, the multistage polarized light conversion waveguide may have, therein in different quantities, polarized light conversion waveguides having the oblique holes 221 provided in one direction and polarized light conversion waveguides having the oblique holes 222 provided in another direction. Moreover, the multistage polarized light conversion waveguide may connect together polarized light conversion waveguides having different quantities of oblique holes.

FIG. 8 shows a second embodiment of the polarized light mode converter having a multistage polarized light conversion waveguide, where (a) represents a plan view and (b) represents a sectional view taken along a line A-A' of the plan view. This polarized light mode converter has a main body 31, holes 32, and a waveguide 33 which are formed in the same manner as those of the polarized light mode converters described above. The cycle interval and radius of the holes 32 and the thickness of the main body 31 are the same as those of the embodiment described above. In this waveguide 33, a groove 341 is formed which extends in a direction parallel to the waveguide 33 and which has a width extending from the center of the waveguide 33 to one side. The groove is 0.1a in depth and 10a in length. Due to the presence of this groove, the waveguide 33 loses symmetry in both the horizontal and vertical directions, and the range with the groove 341 serves as a polarized light conversion waveguide 351. In connection with the polarized light conversion waveguide 351, on a side opposite to the waveguide 33, a polarized light conversion waveguide 352 is formed which is provided with a groove 342 having the same shape as that of the groove 341. These polarized light conversion waveguides 351 to 356 are provided alternately, thereby forming a polarized light mode converter having the multistage polarized light conversion waveguide 35 of the second embodiment. Maximum transmittance and maximum conversion efficiencies were calculated for the polarized light mode converter having the multistage polarized light conversion waveguide 35 of the second embodiment formed in this manner. As a result, the maximum transmittance was 65% and the maximum conversion efficiency was 40%.

Figure 9:
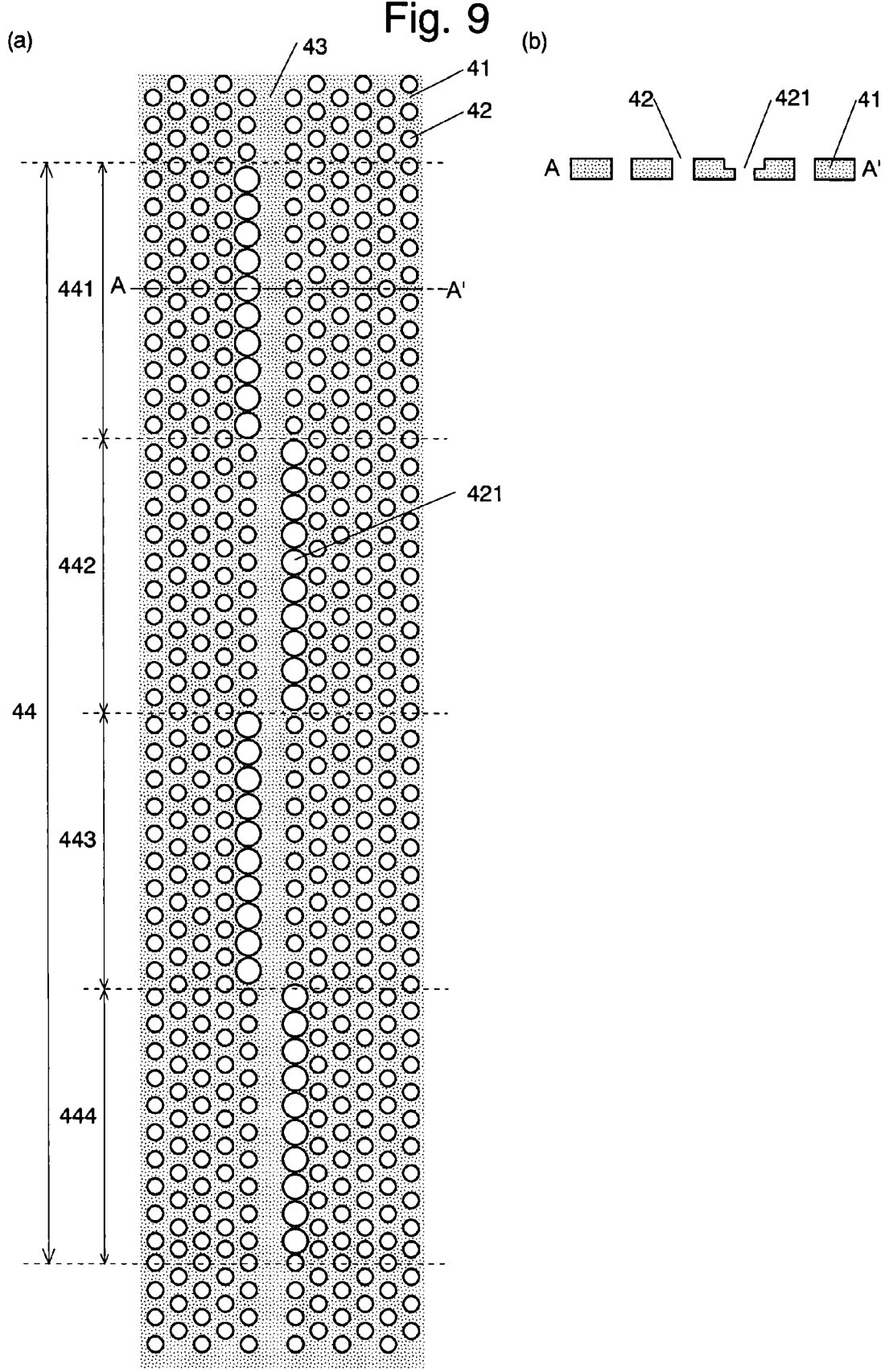
FIG. 9 shows plan and sectional views illustrating the third embodiment of the polarized light mode converter having a multistage polarized light conversion waveguide.

FIG. 9 shows a third embodiment of the polarized light mode converter having the multistage polarized light conversion waveguide, where (a) represents a plan view and (b) represents a sectional view taken along a A-A' line of the plan view. This polarized light mode converter has a main body 41, holes 42, and a waveguide 43 which are formed in the same manner as those of the polarized light mode converters described above. The cycle interval and radius of the holes 42 and the thickness of the main body 41 are the same as those of the embodiments described above. Holes 421 located on one side of this waveguide 43 are formed larger only at an upper half of the main body. Here, the radius at the upper half of the main body is 0.45a (the radius at the lower half is 0.29a, which is the same as that of the other holes 42). With a set of ten such holes 421 provided on one side as one unit, polarized light conversion waveguides 441, 442, 443 and 444 provided alternately on the two sides are sequentially connected together, thereby forming a multistage polarized light conversion waveguide 44. Maximum transmittance and maximum conversion efficiencies were calculated for the polarized light mode converter having the multistage polarized light conversion waveguide 44 of the third embodiment formed in this manner. As a result, the maximum transmittance was 65% and the maximum conversion efficiency was 20%.

Next, embodiments of an optical multiplexer/demultiplexer using the polarized light mode converter of the present invention will be described, referring to FIGS. 10 and 11.

Figure 10:
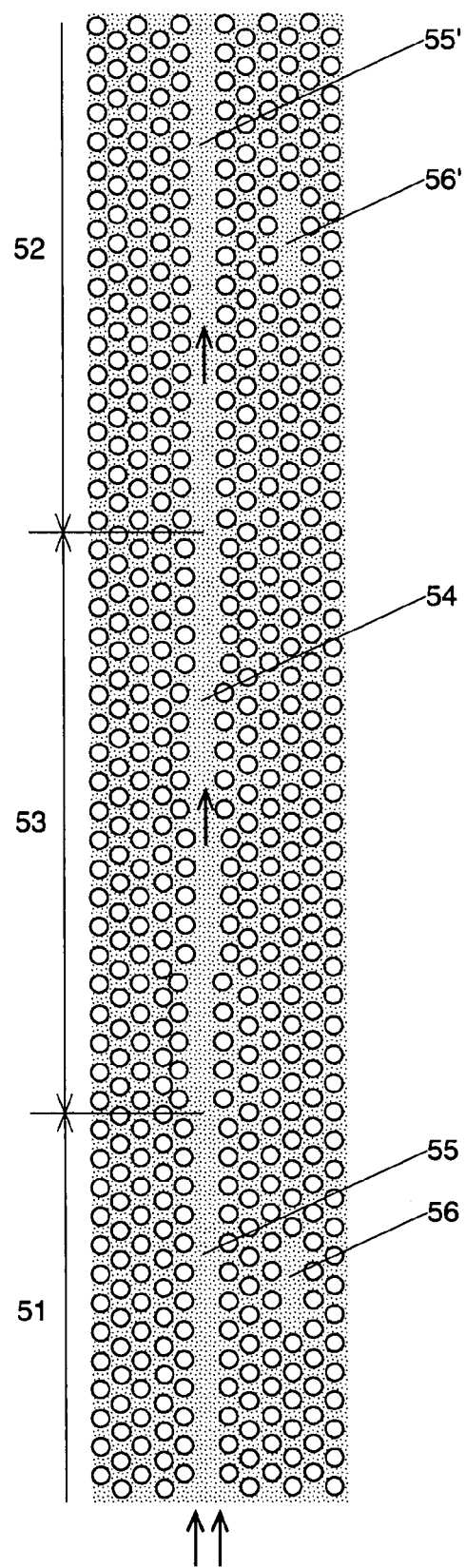
FIG. 10 shows a plan view of the first embodiment of an optical multiplexer/demultiplexer equipped with a polarized light mode converter of the present invention.

The optical multiplexer/demultiplexer equipped with a polarized light mode converter of the first embodiment shown in FIG. 10 has, between a first optical multiplexer/demultiplexer 51 having a resonator 56 near a waveguide 55 and a second optical multiplexer/demultiplexer 52, a multistage polarized light mode converter 53 of the first embodiment having a polarized light conversion waveguide 54. In the first and second optical multiplexer/demultiplexers 51 and 52, respectively, cylindrical holes 57 are arranged in the form of a triangular lattice, a waveguides 55 is formed by omitting one row of these holes 57, and further a resonator 56 is formed by linearly omitting three holes 57 located away from the waveguide with an intervention of three rows of the holes 57. Both the resonator 56 of the first optical multiplexer/demultiplexer 51 and a resonator 56' of the optical multiplexer/demultiplexer 52 resonate only with TE polarized light of a predetermined frequency fr and does not resonate with TM polarized light of this frequency fr.

An operation of the optical multiplexer/demultiplexer equipped with a polarized light mode converter formed in this manner will be described. To the waveguide 55 of the first optical multiplexer/demultiplexer 51, multiplexed light including light of the resonance frequency fr of the resonators 56 and 56' is introduced. Of this multiplexed light, TE polarized light of the frequency fr is captured by the resonator 56 and extracted from the waveguide, while other light including TM polarized light of the frequency fr passes through the resonator 56 and is introduced to the polarized light conversion waveguide 54. In the polarized light conversion waveguide 54, a part (75% at maximum for the multistage polarized light mode converter of the first embodiment) of the TM polarized light of the frequency fr is converted into TE polarized light. The light of the frequency fr converted to TE polarized light in this manner is captured from the waveguide 55' of the second optical multiplexer/demultiplexer 52 by the resonator 56' and extracted from the waveguide 55'. Consequently, the optical multiplexer/demultiplexer equipped with a polarized light mode converter of the first embodiment can demultiplex light of the resonance frequency fr including not only light introduced to the waveguide 55 in the form of TE polarized light but also a part of light introduced thereto in the form of TM polarized light, thus the demultiplexing efficiency is enhanced.

Figure 11:
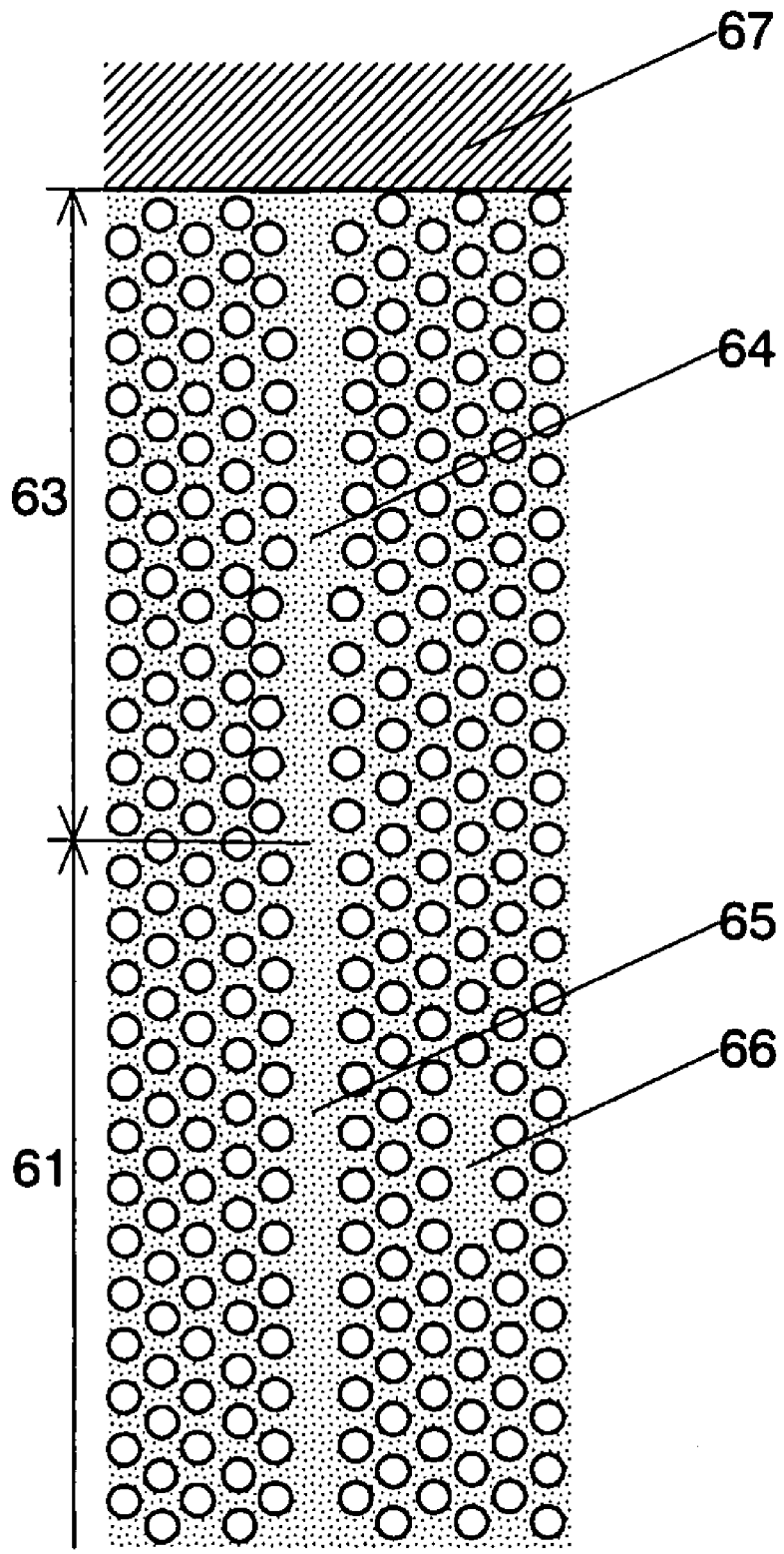
FIG. 11 shows a plan view of the second embodiment of the optical multiplexer/demultiplexer equipped with a polarized light mode converter of the present invention.

FIG. 11 shows a plan view of the optical multiplexer/demultiplexer equipped with a polarized light mode converter of the second embodiment. This optical multiplexer/demultiplexer equipped with a polarized light mode converter has: a first optical multiplexer/demultiplexer 61 having a resonator 56 near a waveguide 55, a multistage polarized light mode converter 63 having a polarized light conversion waveguide 64, and a reflection mirror 67 that reflects light propagating through the polarized light conversion waveguide 54, which are connected in this order. An operation of this optical multiplexer/demultiplexer equipped with a polarized light mode converter will be described. To the waveguide 65 of the first optical multiplexer/demultiplexer 61, the multiplexed light described above is introduced. As is the case with the optical multiplexer/demultiplexer of the first embodiment, TE polarized light having the resonance frequency fr is captured by the resonator 66 and extracted from the waveguide, while other light is introduced to the polarized light conversion waveguide 64. In the polarized light conversion waveguide 64, a part of TM polarized light of the frequency fr is converted into TE polarized light and further reflected by the reflection mirror 67 to be thereby reintroduced to the waveguide 65. Then the light converted to TE polarized light is captured by the resonator 66 and extracted from the waveguide 65. Consequently, the optical multiplexer/demultiplexer equipped with a polarized light mode converter of the second embodiment can extract, from one resonator 66, light of the frequency fr including not only light introduced to the waveguide 65 in the form of TE polarized light but also a part of light introduced thereto in the form of TM polarized light.

Figure 12:
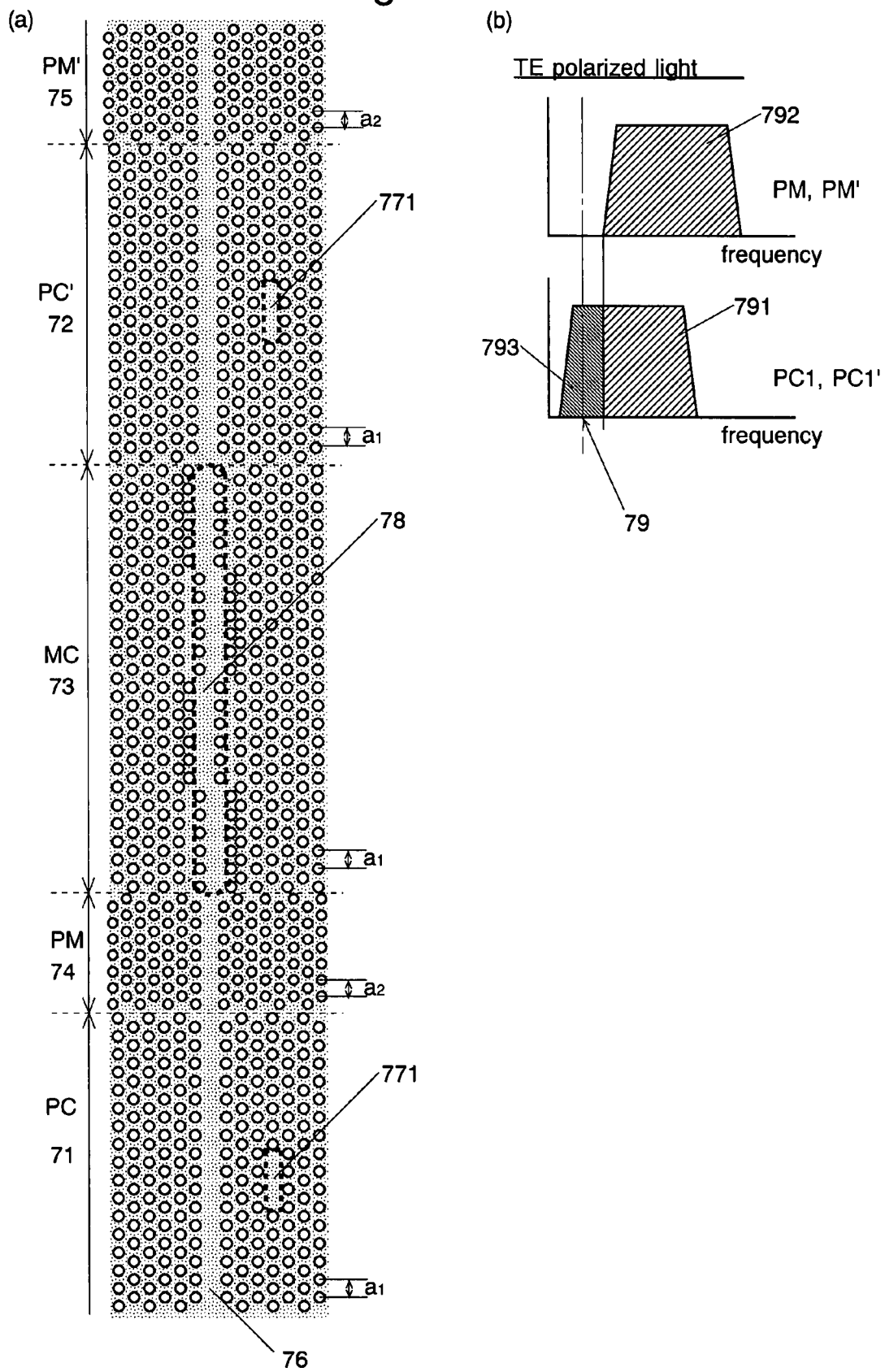
FIG. 12 shows plan views of an embodiment of an optical multiplexer/demultiplexer equipped with a polarized light mode converter provided with a two-dimensional photonic crystal reflector.

FIG. 12(a) shows a plan view of an embodiment of an optical multiplexer/demultiplexer equipped with a polarized light mode converter provided with two-dimensional photonic crystal reflectors. This optical multiplexer/demultiplexer equipped with a polarized light mode converter has: a first optical multiplexer/demultiplexer (PC) 71, a first two-dimensional photonic crystal reflector (PM) 74, a polarized light mode converter (MC) 73, a second optical multiplexer/demultiplexer (PC') 72, and a second two-dimensional photonic crystal reflector (PM') 75, which are serially connected in this order. The first optical multiplexer/demultiplexer 71 and the second optical multiplexer/demultiplexer 72 have resonators 771 and 772, respectively, near a waveguide 76. The polarized light mode converter 73 has a multistage polarized light conversion waveguide 78 connected to the waveguide 76. For these first optical multiplexer/demultiplexer 71, second optical multiplexer/demultiplexer 72 and the polarized light mode converter 73, those mentioned above can be used. The first and second two-dimensional photonic crystal reflectors 74 and 75 have a scaled-down structure of the first optical multiplexer/demultiplexer 71 (similarly for the second optical multiplexer/demultiplexer 72). The cycle interval a2 of holes of these two-dimensional photonic crystal reflectors 74 and 75 is made smaller than the cycle interval a1 of holes of the first optical multiplexer/demultiplexer 71.

In this case, as shown in FIG. 12(b), the frequency band 792 of light that can pass through a waveguide of the two-dimensional photonic crystal reflector 74 moves to a higher frequency side than the waveguide passage frequency band 791 for the first optical multiplexer/demultiplexer 71. Thus, light having frequencies in a part (frequency band 793) of the waveguide passage frequency band 791 can pass through the waveguide of the first optical multiplexer/demultiplexer 71 but cannot pass through the waveguide of the two-dimensional photonic crystal reflector 74. For TE polarized light, the resonance frequency of a resonator 771 formed by omitting three holes in parallel to the waveguide falls near the lower frequency end of the waveguide passage frequency band 791, and thus is included in the frequency band 793 (see Unexamined Japanese Patent Publication No. 2004-233941). Thus, of TE polarized light of this frequency propagating through the waveguide 76, light that has passed therethrough without being captured by the resonator 771 is reflected by the first two-dimensional photonic crystal reflector 74. A part of the reflected light is captured by the resonator 771. Similarly, of TE polarized light of this frequency to which TM polarized light is converted by the multistage polarized light conversion waveguide 78, light that has passed without being captured by the resonator 772 is reflected by the second two-dimensional photonic crystal reflector 75 and a part of this reflected light is captured by the resonator 772. Consequently, the ratio in which the TE polarized light of this resonance frequency is captured by the resonators 771 and 772 increases, thus the demultiplexing efficiency is enhanced.

Figure 13:
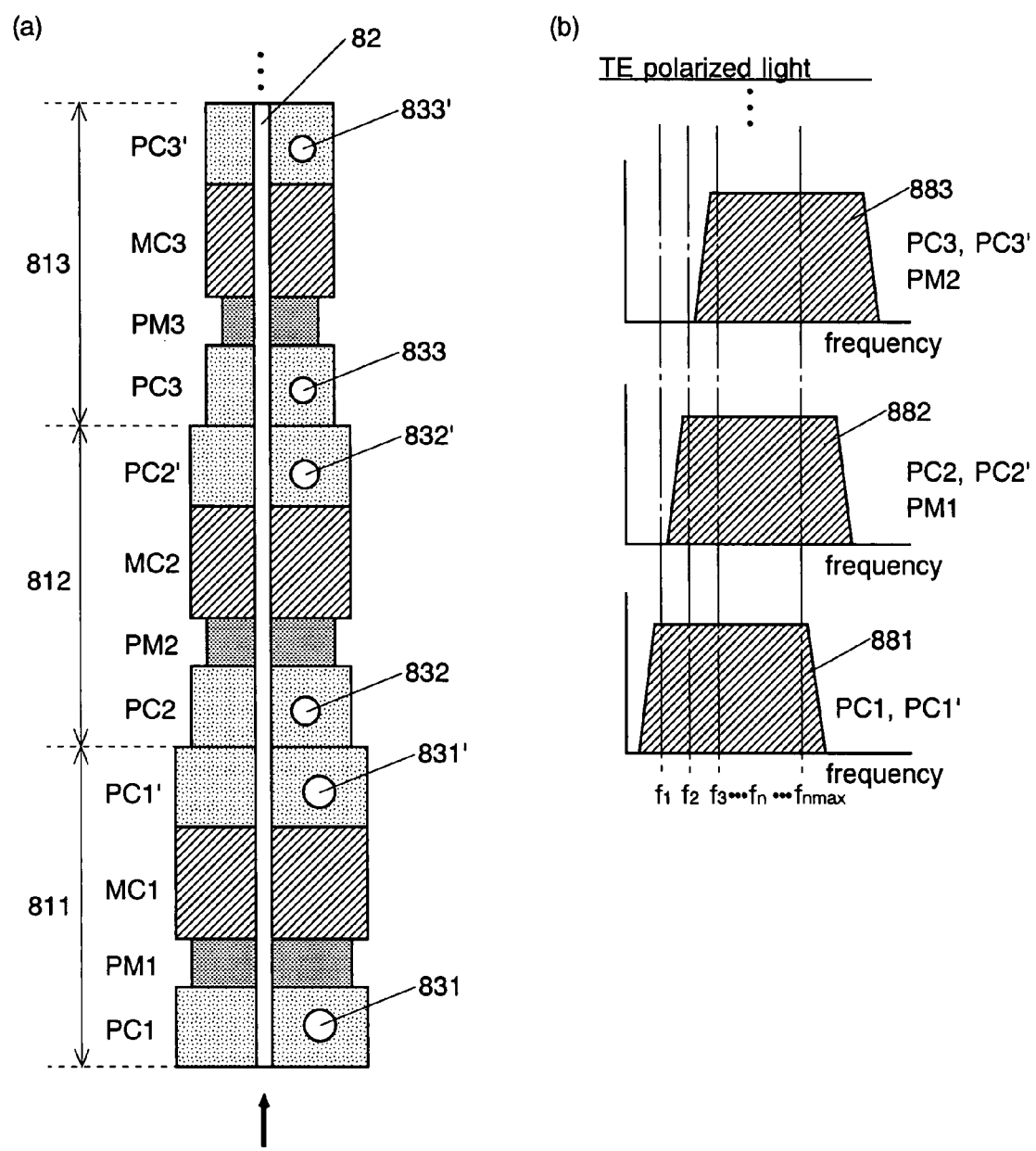
FIG. 13 shows schematic diagrams illustrating one embodiment of a multistage optical multiplexer/demultiplexer equipped with a polarized light mode converter of the present invention.

FIG. 13(a) shows a schematic diagram of one embodiment of a multistage optical multiplexer/demultiplexer equipped with a polarized light mode converter of the present invention. This multistage optical multiplexer/demultiplexer equipped with a polarized light mode converter has optical multiplexer/demultiplexer equipped with a polarized light mode converters 811, 812, ..., 81n, ... (81n is the n-th optical multiplexer/demultiplexer equipped with a polarized light mode converter counted from the optical multiplexer/demultiplexer equipped with a polarized light mode converter 811) which are serially connected together and which have the same configuration as that of the optical multiplexer/demultiplexer equipped with a polarized light mode converter shown in FIG. 12(a) with the second two-dimensional photonic crystal reflector PM' omitted. The optical multiplexer/demultiplexer equipped with a polarized light mode converter 81n has a first optical multiplexer/demultiplexer PCn, a two-dimensional photonic crystal reflector PMn, a polarized light mode converter MCn, and a second optical multiplexer/demultiplexer PCn'. In addition, a waveguide 82 is formed which penetrates through all the polarized light mode conversion optical multiplexers/demultiplexers. To this waveguide 82, multiplexed light of a plurality of frequencies is introduced from an optical multiplexer/demultiplexer equipped with a polarized light mode converter 811 side. Thus, the optical multiplexer/demultiplexer equipped with a polarized light mode converter 811 side is called an upstream side here. The waveguide 82 serves as a multistage polarized light conversion waveguide in the polarized light mode converter MCn.

Different refractive index regions of the first optical multiplexer/demultiplexer PCn are arranged at smaller cycle intervals than those of different refractive index regions of the first optical multiplexer/demultiplexer PC(n−1) located on the upstream side thereof. The same applies to the second optical multiplexer/demultiplexer and the polarized light mode converter. Different refractive index regions of the two-dimensional photonic crystal reflector PMn are arranged at the same cycle intervals as those of different refractive index regions of the first optical multiplexer/demultiplexer PC(n+1) located on the downstream side thereof in the present embodiment. The first optical multiplexers/demultiplexers PCn respectively have resonators 831, 832, ..., 83n, ... that resonate with TE polarized light, and the second optical multiplexers/demultiplexers PCn' respectively have resonators 831', 832', ..., 83n', .... As the cycle interval of the different refractive index regions decreases (or as n increases), the resonance frequency fn increases. Moreover, the resonators 83n and 83n', as is the case of those in FIG. 12, have a resonance frequency fn falling near the lower frequency end of the waveguide passage frequency bands 881, 882, ..., 88n, ... in the first optical multiplexer/demultiplexer PCn and the second optical multiplexer/demultiplexer PCn' (FIG. 13(*b*)). Thus, TE polarized light of the resonance frequency fn cannot propagate through the waveguides of the two-dimensional photonic crystal reflector PMn and the first optical multiplexer/demultiplexer PC (n+1), and are reflected by the two-dimensional photonic crystal reflector PMn and the first optical multiplexer/demultiplexer PC (n+1). Through adjustment of the cycle intervals of the different refractive index regions so that the resonance frequency fnmax of resonators 83nmax and 83nmax' provided in the optical multiplexer/demultiplexer equipped with a polarized light mode converter 81nmax located at the most downstream side is included in the waveguide passage frequency band 881 of the first optical multiplexer/demultiplexer PCn, the entire TE polarized light of the resonance frequency can propagate through the waveguide 82 located on the upstream side of the first optical multiplexer/demultiplexer PCn (FIG. 13(*b*)).

An operation of the multistage optical multiplexer/demultiplexer equipped with a polarized light mode converter of the present embodiment will be described. To the waveguide 82 from the optical multiplexer/demultiplexer equipped with a polarized light mode converter 811 side, multiplexed light of frequencies f1, f2, ..., fn, ..., fnmax is introduced. First, in the first optical multiplexer/demultiplexer PC1 of the optical multiplexer/demultiplexer equipped with a polarized light mode converter 811, TE polarized light of the frequency f1 is captured by a resonator 831. However, part of this TE polarized light passes without being captured by the resonator 831, and is reflected by the two-dimensional photonic crystal reflector PM1. Then part of the reflected TE polarized light of the frequency f1 is captured by the resonator 831. On the other hand, TM polarized light and TE polarized light of the frequencies other than the frequency f1 passes through the first optical multiplexer/demultiplexer PC1 and the two-dimensional photonic crystal reflector PM1, and are introduced to the polarized light mode converter MC1. In the polarized light mode converter MC1, part of TM polarized light of the frequency f1 is converted into TE polarized light. This light of the frequency f1 converted to TE polarized light is captured by the resonator 831' of the second optical multiplexer/demultiplexer PC1'. However, part of this light passes without being captured by the resonator 831', and is reflected by the first optical multiplexer/demultiplexer PC2 of the optical multiplexer/demultiplexer equipped with a polarized light mode converter 812 and captured by the resonator 831'. Light of the frequencies other than the frequency f1 passes through the second optical multiplexer/demultiplexer PC1'.

In the polarized light mode converting optical multiplexers/demultiplexers 81n of the second place and after, as is the case with the optical multiplexer/demultiplexer equipped with a polarized light mode converter 811, the TE polarized light of the frequency fn is captured by the resonator 83n of the first optical multiplexer/demultiplexer PCn, and a part of TM polarized light of the frequency fn is converted into TE polarized light by the polarized light mode converter MCn and captured by the resonator 83n' of the second optical multiplexer/demultiplexer PCn'. In this condition, the TE polarized light of the frequency fn that has passed through the resonators 83n and 83n' is reflected by the two-dimensional photonic crystal reflector PMn and the first optical multiplexer/demultiplexer PC (n+1) of the optical multiplexer/demultiplexer equipped with a polarized light mode converter located adjacently on the downstream side thereof and captured by the resonators 83n and 83n'.

As described above, each optical multiplexer/demultiplexer equipped with a polarized light mode converter 81n can demultiplex the TE polarized light of the frequency fn. With the multistage optical multiplexer/demultiplexer equipped with a polarized light mode converter of the present embodiment, the two-dimensional photonic crystal reflector PMn and the first optical multiplexer/demultiplexer PC (n+1) reflect the TE polarized light of the frequency fn, thus increasing the ratio in which this light is captured by the resonators 83n and 83n', thereby the demultiplexing efficiency is enhanced.

The invention claimed is:

1. A polarized light mode converter comprising:
    (a) a two-dimensional photonic crystal made of a slab-like main body provided with a plurality of different refractive index regions arranged in a lattice in the main body, the different refractive index regions having a refractive index different from that of the main body; and
    (b) a polarized light conversion waveguide for converting polarized light between TM polarized light and TE polarized light, composed of defects of the different refractive index regions arranged linearly, whose cross-sectional shape is asymmetrical in a vertical and in a horizontal direction.

2. The polarized light mode converter according to claim 1, wherein
    a plurality of waveguides are connected together, the cross-sectional shapes of the plurality of waveguides being different from each other.

3. The polarized light mode converter according to claim 1, wherein
    the asymmetry of the cross-sectional shape is realized by providing on a side of the waveguide a different refractive index region extending in a direction oblique to a surface of the main body.

4. The polarized light mode converter according to claim 1, wherein
    the asymmetry of the cross-sectional shape is realized by making a part of the main body in the waveguide to have a thickness different from that of other regions.

5. The polarized light mode converter according to claim 1, wherein
    the asymmetry of the cross-sectional shape is realized by providing on one side of the waveguide a different refractive index region having a vertically asymmetrical shape.

6. An optical multiplexer/demultiplexer equipped with a polarized light mode converter comprising:
    a) first and second two-dimensional photonic crystal optical multiplexers/demultiplexers having: a waveguide for conducting light of a predetermined frequency; and a resonator provided near the waveguide and resonating with predetermined polarized light of the frequency; and
    b) the polarized light mode converter according to claim 1, provided between the two two-dimensional photonic crystal optical multiplexers/demultiplexers, for converting polarized light of the frequency.

7. The polarized light mode converter according to claim 6, wherein
    two-dimensional photonic crystal reflectors for reflecting the polarized light of the predetermined frequency are provided respectively: between the first two-dimensional photonic crystal optical multiplexer/demultiplexer and the polarized light mode converter; and on a side opposite to the polarized light mode converter of the second two-dimensional photonic crystal optical multiplexer/demultiplexer.

8. A multistage optical multiplexer/demultiplexer equipped with a polarized light mode converter made of a plurality of serially connected polarized light mode conversion optical multiplexers/demultiplexers according to claim 6, where a two-dimensional photonic crystal reflector for reflecting the polarized light of the predetermined frequency is provided between the first two-dimensional photonic crystal optical multiplexer/demultiplexer and the polarized light mode converter, wherein in every optical multiplexer/demultiplexer equipped with a polarized light mode converter:

all waveguides located on an upstream side of the two-dimensional photonic crystal reflector are so formed as to permit passage, therethrough, of polarized light of a frequency resonating with a resonator of the first photonic crystal optical multiplexer/demultiplexer located adjacently to the two-dimensional photonic crystal reflector; and a waveguide of the first photonic crystal optical multiplexer/demultiplexer is so formed as to reflect polarized light of a frequency resonating with a resonator of the second photonic crystal optical multiplexer/demultiplexer located adjacently on an upstream side of the first photonic crystal optical multiplexer/demultiplexer.

9. An optical multiplexer/demultiplexer equipped with a polarized light mode converter comprising:

(a) a two-dimensional photonic crystal optical multiplexer/demultiplexer having: a waveguide for conducting light of a predetermined frequency, and a resonator provided near the waveguide and resonating with predetermined polarized light of the frequency;

(b) a reflection section for reflecting polarized light of the frequency; and (c) a polarized light mode converter according to claim 1, provided between the two-dimensional photonic crystal optical multiplexer/demultiplexer and the reflection section, for converting polarized light of the frequency.

* * * * *